United States Patent [19]

George

[11] 4,275,510
[45] Jun. 30, 1981

[54] HEAT RECOVERY IN A LAUNDRY SYSTEM

[76] Inventor: Odean F. George, P.O. Box 6734, Jacksonville, Fla. 32205

[21] Appl. No.: 44,509

[22] Filed: Jun. 1, 1979

[51] Int. Cl.³ ............................................. F26B 11/04
[52] U.S. Cl. ............................................ 34/90; 34/86; 34/131; 34/133; 68/16; 68/20; 165/104.21; 165/104.26
[58] Field of Search ...................... 34/86, 90, 131, 133, 34/139, 19, 35; 165/105; 68/16, 20

[56] References Cited

U.S. PATENT DOCUMENTS

| 3,050,867 | 8/1962 | Friedman | 34/86 |
| 3,402,767 | 9/1968 | Bohdansky et al. | 165/105 |
| 3,414,475 | 12/1968 | Fiebelmann | 165/105 X |
| 3,771,238 | 11/1973 | Vaughn | 34/133 X |
| 3,884,292 | 5/1975 | Pessoland et al. | 165/105 X |
| 4,037,786 | 7/1977 | Munroe | 165/105 X |
| 4,103,433 | 8/1978 | Taylor | 165/105 X |
| 4,116,266 | 9/1978 | Sawata et al. | 165/105 |

*Primary Examiner*—Albert J. Makay
*Assistant Examiner*—Harold Joyce
*Attorney, Agent, or Firm*—Arthur G. Yeager

[57] ABSTRACT

In a laundry system including a washer, a dryer, and a water heater, the improvement of using a heat pipe to recover waste heat, whether it be from the hot air exhaust of the dryer or from the conductive losses from the dryer and to transfer that heat to the feed water of the water heater.

5 Claims, 6 Drawing Figures

HEAT RECOVERY IN A LAUNDRY SYSTEM

BACKGROUND OF THE INVENTION

The normal laundry system today includes a washer which employs hot water or cold water, depending upon the materials being washed, and a dryer which tumbles the washed clothes in a stream of hot air. The exhaust from the dryer is normally screened to catch as much lint as possible and then exhausted to the atmosphere. While the heat exhausted from the single cycle of a drying operation is not enormous the sum of many such cycles represents a significant waste of heat, particularly in times when energy saving is an important consideration. In the typical commercial installation where a large number of washers and dryers are avilable for individual use, the total waste of energy is large. There have been previous attempts by laundries to conserve the heat which is normally lost to the atmosphere. In each of U.S. Pat. Nos. 3,050,867 to Friedman and 3,771,238 to Vaughn there are systems for preheating feed water to the water heaters by circulating it through the hot air exhaust from the dryers to recover some portion of heat. In U.S. Pat. No. 3,771,238 the feed water to the water heater circulates through a coil of pipe at the top of each dryer in series where recirculated hot air exhaust is blown across the coil and back into the fire box of the dryer. Such a system functions well and transfers heat efficiently but it requires a considerable amount of expensive piping and plumbing fixtures. In U.S. Pat. No. 3,050,867 the feed water to the water heater circulates in parallel through finned tube coils placed in the hot air exhaust stack of each dryer. This, likewise, is an expensive arrangement in that finned tube coils must be custom made to fit the exhaust stack. It is an object of the present invention to provide an improved system for recovering a substantial amount of the waste heat from a laundry dryer and incorporating it into the feed to the water heater.

BRIEF SUMMARY OF THE INVENTION

This invention is an improvement in a laundry system employing a hot water washer, a dryer having a hot air exhaust, and a water heater, the improvement being the use of a heat pipe on the dryer to transfer waste heat from the dryer or from it hot air exhaust to the feedwater to the water heater. In a specific embodiment of this invention the heat pipe is a partially evacuated elongated sealed vessel made of heat conductive material containing a small portion of its internal volume filled with a liquid having a boiling point at the pressure inside of the vessel of about 100°–200° F. In a preferred system the liquid in the heat pipe is water and the pressure inside the vessel is 1–12 psia.

The novel features believed to be characteristic are set forth with particularity in the appended claims. The invention itself, however, both as to its organization and method of operation, together with further objects and advantages thereof, may be best be understood by reference to the attached drawings and to the following description.

DETAILED DESCRIPTION OF THE INVENTION

Figure 1:
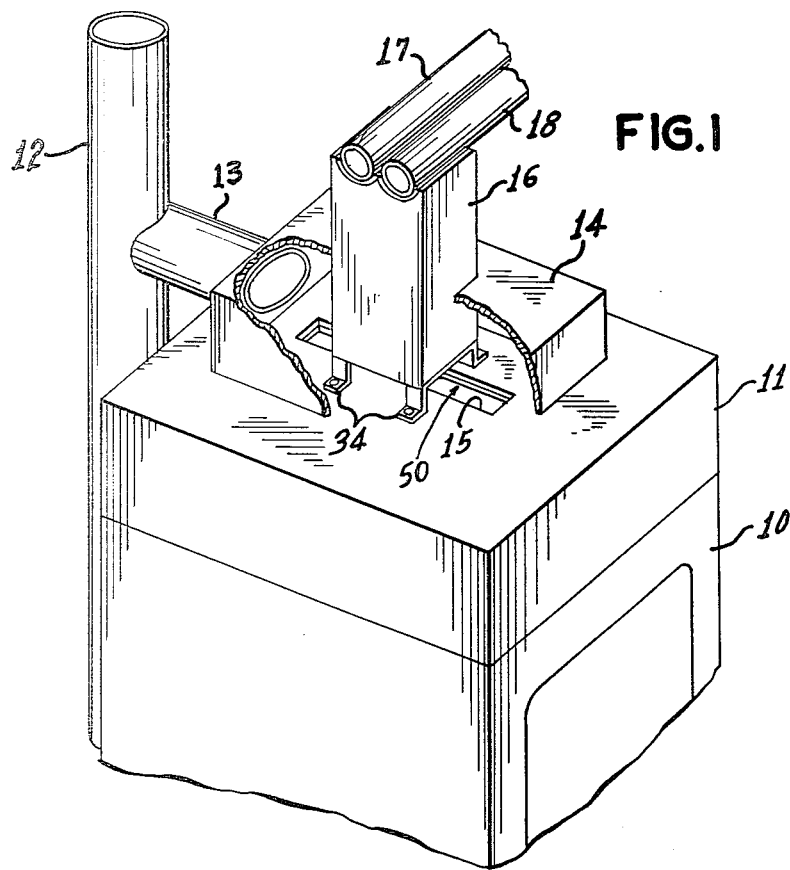
FIG. 1 is a perspective view of a laundry dryer employing a heat pipe to conserve waste heat from the hot air exhaust.

In FIG. 1 there is shown a typical laundry dryer 10 having in its upper portion 11 a fire box 50 in which air is heated for circulation through the dryer. The fire box may have any convenient means for producing heat, such as electric coils, gas jets, oil burners, etc. The hot air is circulated through the revolving drum of the dryer collecting moisture from the wet clothes being processed in the dryer and the resulting hot moist air is exhausted from the bottom of the dryer through stack 12. In some modern systems a substantial portion of the hot exhaust air is recirculated through the dryer in order to achieve a greater efficiency of heat usage and of moisture pick-up. This is accomplished by cutting an opening 15 in the top of dryer 10 and through the fire box as illustrated by, for example, U.S. Pat. No. 3,157,391, installing an enclosed cover 14 over that opening and connecting cover 14 and stack 12 with recirculation pipe 13. A suitable damper (not shown) is installed in stack 12 at its junction with recirculation pipe 13 to direct a substantial portion of the exhaust gases into recirculation pipe 13. Even with such recirculation the exhaust gases rising in stack 12 have a substantial amount of heat content which can be recovered thus provide even greater efficiency of heat utilization.

In this invention heat pipe 16 is positioned with its lowermost portion inside cover 14 and in the direct path of the hot air exhaust being returned through pipe 13. In order not to obstruct the flow of hot air from pipe 13 through opening 15 into the fire box, heat pipe 16 is set on legs 34 to elevate the bottom of heat pipe 16 above opening 15. Pipes 17 and 18 are part of a water circulation system conducting cool water to the water heater, and are made to pass over heat pipe 16 to absorb as much heat as possible from the top of heat pipe 16.

Figure 3:
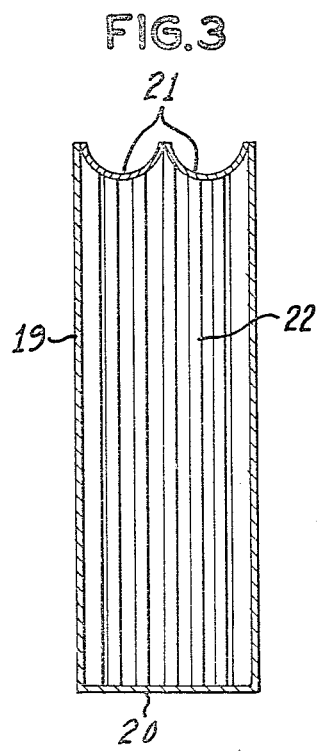
FIG. 3 is a cross sectional view taken along line 3—3 of FIG. 2.
Figure 2:
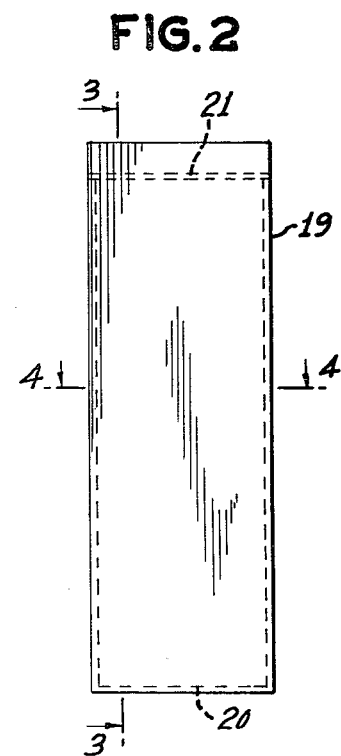
FIG. 2 is a side elevation view of the heat pipe of this invention.
Figure 4:
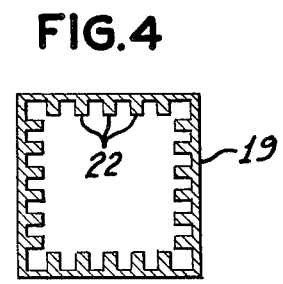
FIG. 4 is a cross sectional view taken along line 4—4 of FIG. 2.

In FIGS. 2, 3, and 4 there may be seen the construction of a typical heat pipe 16 as is employed in FIG. 1. Heat pipes are described generally in Mechanix Illustrated, December 1978, pages 29–31 and 118. These devices are employed to provide rapid transfer of heat from the lower end of the pipe to the upper end of the pipe. The principle involved in this heat transfer is to absorb heat in the lower portion of the heat pipe which will cause a liquid inside the heat pipe to vaporize and rise to the upper end of the pipe where the vapors will condense releasing heat at that point with the condensed liquid flowing down the inside of the pipe and returning to the liquid reservoir at the bottom. The temperature level of the heat to be transferred will dictate the liquid to be employed inside the heat pipe and the pressure inside the heat pipe. For the conditions involved in a laundry the hot air exhaust is at temperatures of 100°–200° F. and therefore the liquid should be one which boils in that range. If the internal volume of the heat pipe is suitably evacuated to reduce the pressure to about 1-12 psia, water is an admirable liquid for this purpose. Any competent scientist can choose any of several other liquids which would be suitable for this purpose by referring to the boiling points of liquids as set forth in standard chemical tables. For example ethyl alcohol boiling about 173° F. benzene boiling at about 176° F., acetone boiling at about 133° F., chloroform boiling at about 142° F., etc. are all suitable liquids the purposes of this invention.

The cross sectional shape of the heat pipe may be any suitable configuration although circular and rectangular are most common. In the present invention there is shown a rectangular heat pipe with sidewalls 19, bottom wall 20 and upper wall 21. The material of constriction can be any material which is a good conductor of heat and may be sealed so as to contain a reduced pressure without collapse of the walls due to atmospheric pressure outside. Metals such as copper, aluminum, steel, etc, are most desirable. Wall thickness of the heat pipe will depend upon the inherent strength of the metal employed and the pressure differential from the outside of the inside of the heat pipe. At the upper extremity of the heat pipe in this invention wall 21 is constructed in the form of two parallel halves of cylindrical surfaces which are designed to exactly fit the outside configuration of water pipes 17 and 18 as shown in FIG. 1. Since heat is to be transferred from the inside of heat pipe 16 to water flowing inside of pipes 17 and 18 it is important that the contact between the outer surface of wall 21 and the outer surfaces of pipes 17 and 18 be as complete as possible. It may be advantageous to solder or weld pipes 17 and 18 to the cylindrical surfaces of wall 21 in order to eliminate any film of air which might serve as an insulation and would thereby seriously restrict heat transfer.

The inside surfaces of walls 19 are formed into flutes, fins, or grooves 22 having a generally vertically direction. In order for heat pipes to function properly they must be set in a generally vertical position so that condensing vapor will return to the bottom of the pipe by the force of gravity. By forming flutes, fins, or grooves 22 on the inside surface of the heat pipe the flow of condensed vapor to the bottom of the heat pipe is facilitated. It is not critical that these flutes, fins, or grooves be straight lines; they may be curved, angled, or the like so long as they form a conduit leading from the upper end to the lower end of the heat pipe. The heat pipe must, of course, be completely sealed so as to retain whatever reduced pressure is desired inside the pipe. Heat pipes inherently bettered suited for the conservation of heat in laundry dryers than are the copper coils of the prior art (e.g. U.S. Pat. Nos. 3,050,867 and 3,771,238) because there is substantially no heat transfer from pipes 17 and 18 to heat pipe 16 when the respective dryer is not operating. In dryers with copper coils there will be a substantial heat loss to the atmosphere once a dryer is shut down and no longer produces heat. Heat pipes, on the other hand transfer heat in one direction only, i.e. from the bottom to the top.

Figure 5:
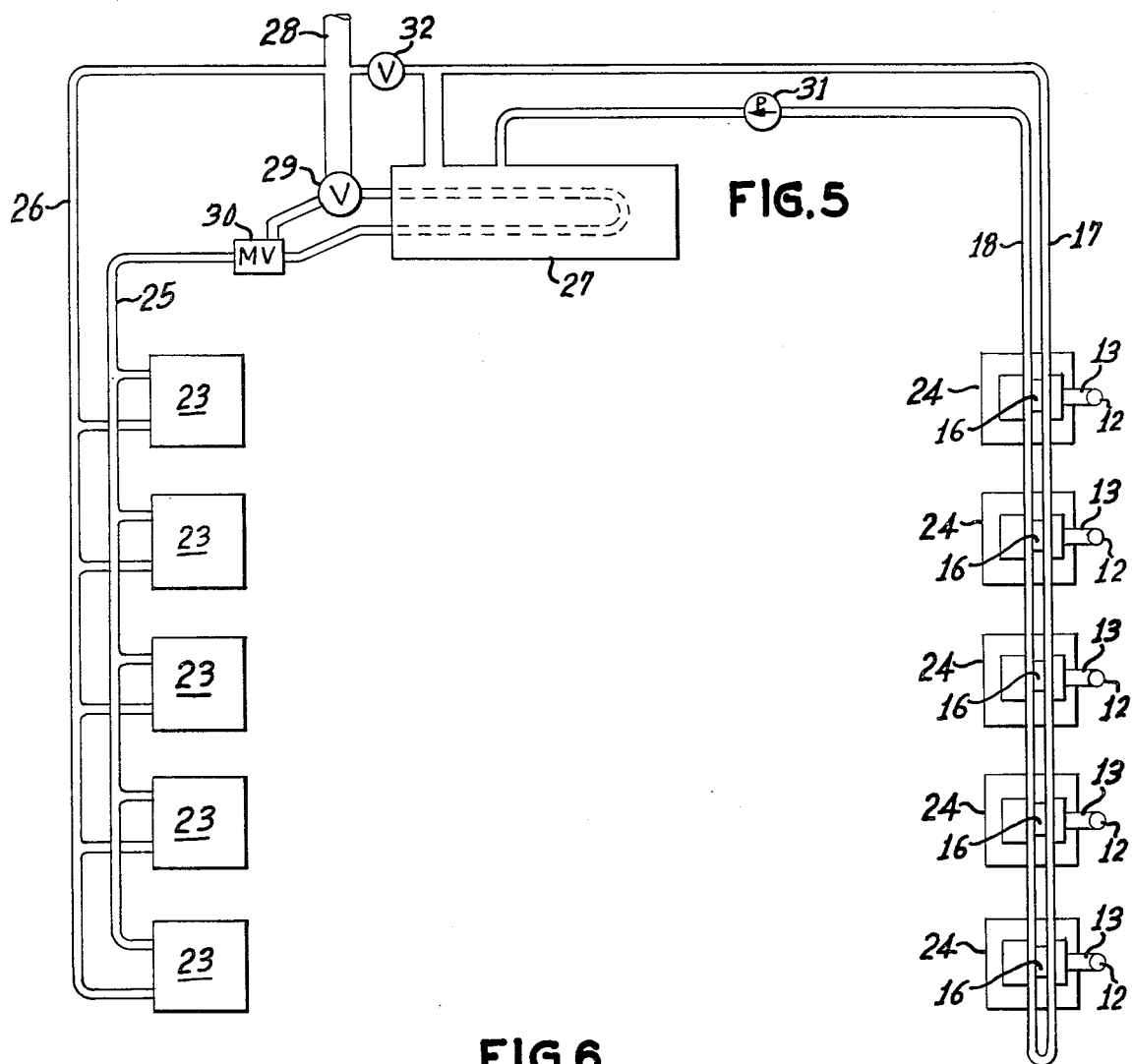
FIG. 5 is a schematic illustration of the application of this invention to a commercial installation including a multiplicity of washers and of dryers.

In FIG. 5 there is shown a general installation of a commercial laundry employing many individual washers and dryers such as found in a coin operated laundry. Washers 23 are connected with suitable hot water pipe 25 and cold water pipe 26 to provide any desired mixture or combination. The water heating means shown here is a boiler with a reserve tank 27 containing boiler water which heats laundry water in suitable internal coils 35 and discharges it at any desired temperature to supply the hot water for pipe 25. Water main 28 provides all of the necessary cold water from the city water service or whatever source is available. This incoming water is connected through valve 29 to coils 27 and also to mixing valve 30. Mixing valve 30 is designed to supply sufficient cold water from water main 28 to be mixed with hot water from boiler 27 to provide whatever temperature is desired for the water in line 25. Mixing valve 30 is normally controlled by a thermostat and/or a servomotor for operating the valve (these being standard items that are not shown on the drawing).

Dryers 24 are each fitted with a heat pipe 16 positioned to absorb waste heat from the dryer. If a portion of the hot air exhaust in stack 12 is recirculated through pipe 13 to the dryer, heat pipe 16 may be placed in the path of that hot air as shown in FIG. 1. The top of each heat pipe 16 is made to accomodate water pipes 17 and 18 which form a loop with the pipes passing in both directions over each of heat pipes 16. Water pipe 17 contains cool water from boiler reserve tank 27 which passes in series over each dryer and then return line 18 also passes over each dryer. This double pass is sufficient to absorb a substantial amount of heat from heat pipes 16, raising the temperature of the water in pipe 18 a substantial amount. Pipe 18 leads through pump 31 to enter boiler reserve tank 27. This system recovers a large portion of the heat which would otherwise be lost through stacks 12 and elsewhere and thereby considerably reduces the heat load on the boiler.

Figure 6:
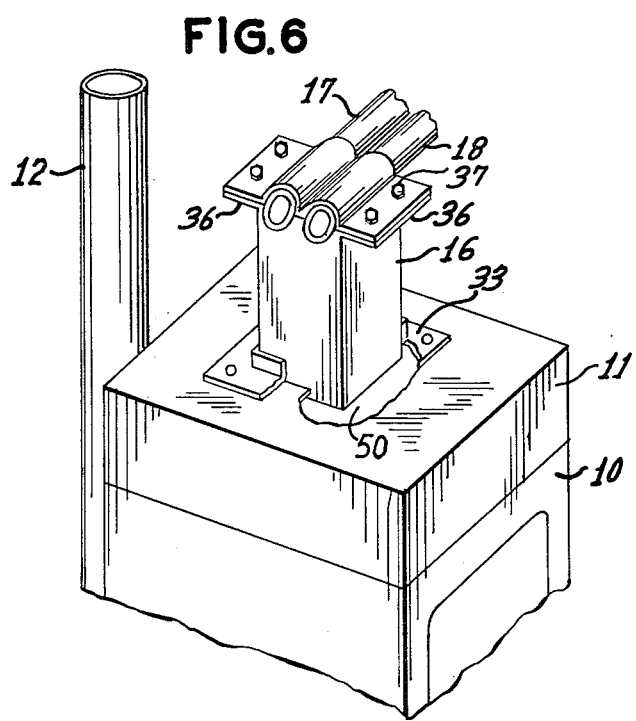
FIG. 6 is a perspective view of a laundry dryer employing a heat pipe to conserve waste heat from the fire box of the dryer.

In FIG. 6 there is another arrangement for recovering waste heat from a dryer wherein hot exhaust air is not recirculated. In this instance heat pipe 16 sits directly on top of the fire box, which merely requires that a hole be cut through the top of dryer 10. Collar 33 can be made to fit over the hole and to fit snugly around heat pipe 16 to prevent any loss of heat. This illustration also shows an alternate method of attaching pipes 17 and 18 to the top of heat pipe 16, which is built with flanges 36. Clamp 37 is then bolted to flanges 36 to provide a tight heat conductive connection between heat pipes 16 and pipes 17 and 18.

It is not critical that the heat absorbed from heat pipes 16 be only that from the top of the dryer. There is waste heat escaping through stack 12 which can be conserved by placing the bottom of a heat pipe in the stack and letting the top of the heat pipe heat feed water for the water heater or any other heat absorbing medium. It is also not critical that water pipes 17 and 18 lead to a boiler reserve tank. By suitable connections pipes 17 and 18 can be part of the same system that conducts hot water to the washers. Pipes 17 and 18 can lead directly from the water main to a hot water heater and thence to the hot water inlet of a washer. On the other hand pipes 17 and 18 can be part of the heating system for the building in which the dryers are located and thus use the conserved heat to heat the air in the building rather than the water used in the laundry. Other alternatives will be apparent to those skilled in the art.

It is understood that insulation of all exposed water lines is contemplated in order to prevent heat losses to the surrounding atmosphere. Suitable insulation around boiler reserve tank 27 would be also considered routine within the course of this invention.

While the invention has been described with respect to certain specific embodiments, it will be appreciated that many modifications and changes may be made by those skilled in the art without departing from the spirit of the invention. It is intended, therefor, by the appended claims to cover all such modifications and changes as fall within the true spirit and scope of the invention.

What is claimed as new and what is desired to secure by Letters Patent of the United States is:

1. In a laundry system comprising a washer employing hot water, a dryer having a fire box, a water heater, and water pipe circulating system conducting cool water to said water heater and distributing hot water to said washer, the improvement which comprises a heat pipe having the bottom thereof in heat conductive contact with the outside surface of said fire box of said dryer and the top of said heat pipe in heat conductive contact with said water pipe circulation system spaced above said dryer in the portion thereof conducting cool water to said water heater.

2. The system of claim 1 wherein water in said water pipe circulation system is in a loop of pipe comprising an outgoing leg and a return leg, both legs being in contact with said heat pipe.

3. The system of claim 1 wherein said heat pipe includes a top end, further comprising means for connecting said top end to said water pipe circulation system for maximizing the heat transfer therebetween.

4. In a laundry system comprising a multiplicity of washers employing hot water, a multiplicity of dryers, each having a fire box, means for heating water to supply said hot water to said washers, and a water pipe circulation system connecting said heating means and said washers, the improvement which comprises a heat pipe on each dryer having the bottom of each heat pipe in conductive contact with said fire box of each said dryer to absorb heat from said dryer and the top of each said heat pipe in heat conductive contact with said water pipe circulation means in the portion thereof conducting water into said heating means.

5. The system of claim 4 in which each said heat pipe is in contact with the outgoing leg and the return leg of a loop of water pipe internally conducting cool water to said heating means.

* * * * *